No. 761,499. PATENTED MAY 31, 1904.
J. KENNEDY.
VALVE MECHANISM.
APPLICATION FILED MAY 7, 1903.
NO MODEL. 5 SHEETS—SHEET 1.

WITNESSES
Warren W. Swartz
H. M. Corwin

INVENTOR
Julian Kennedy
by Bakewell & Byrnes
his Attorneys

No. 761,499. PATENTED MAY 31, 1904.
J. KENNEDY.
VALVE MECHANISM.
APPLICATION FILED MAY 7, 1903.
NO MODEL. 5 SHEETS—SHEET 2.

WITNESSES
Warren W. Swartz
H. M. Corwin

INVENTOR
Julian Kennedy
by Bakewell & Byrnes
his Attorneys

No. 761,499. PATENTED MAY 31, 1904.
J. KENNEDY.
VALVE MECHANISM.
APPLICATION FILED MAY 7, 1903.
NO MODEL. 5 SHEETS—SHEET 3.
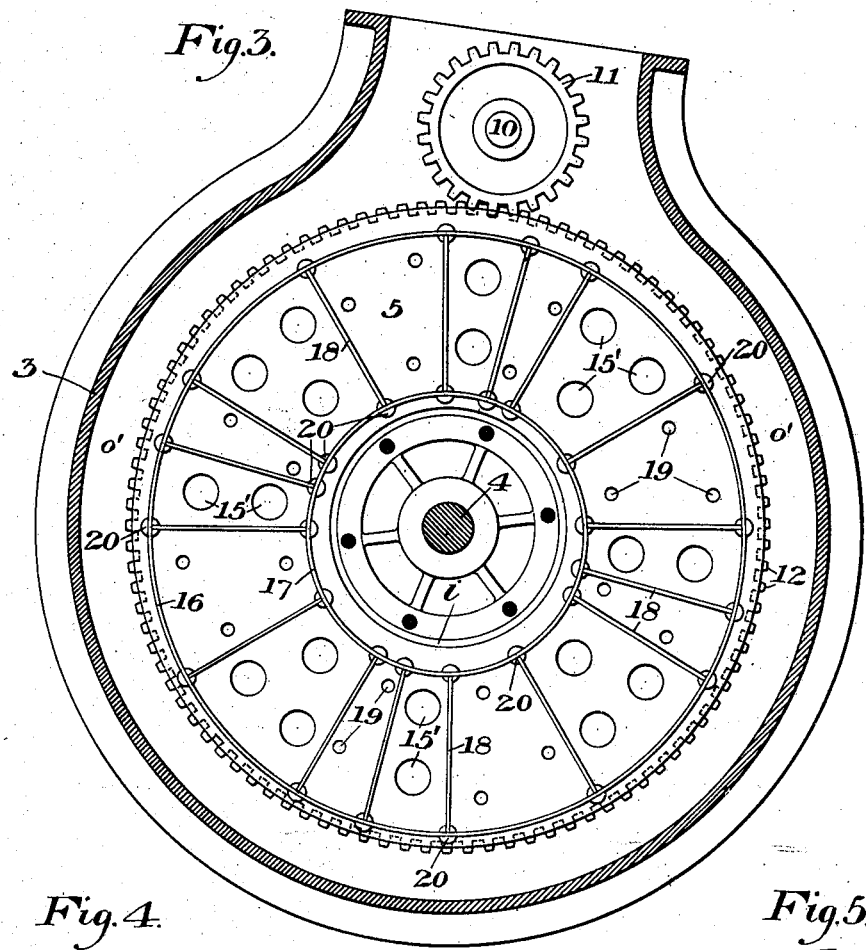
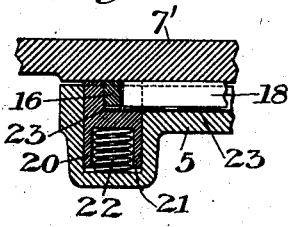
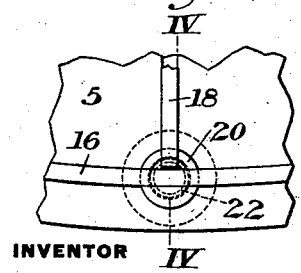
WITNESSES
Warren W. Swartz
N. M. Corwin
INVENTOR
Julian Kennedy
by Bakewell & Byrnes
his Attorneys No. 761,499. PATENTED MAY 31, 1904.
J. KENNEDY.
VALVE MECHANISM.
APPLICATION FILED MAY 7, 1903.
NO MODEL. 5 SHEETS—SHEET 4.

WITNESSES
Warren W. Swartz
INVENTOR
Julian Kennedy
by Bakewell & Byrnes
his Attorneys No. 761,499. PATENTED MAY 31, 1904.
J. KENNEDY.
VALVE MECHANISM.
APPLICATION FILED MAY 7, 1903.
NO MODEL. 5 SHEETS—SHEET 5.

No. 761,499. Patented May 31, 1904.

UNITED STATES PATENT OFFICE.

JULIAN KENNEDY, OF PITTSBURG, PENNSYLVANIA.

VALVE MECHANISM.

SPECIFICATION forming part of Letters Patent No. 761,499, dated May 31, 1904.

Application filed May 7, 1903. Serial No. 155,993. (No model.)

*To all whom it may concern:*

Be it known that I, JULIAN KENNEDY, of Pittsburg, Allegheny county, Pennsylvania, have invented a new and useful Valve Mechanism, of which the following is a full, clear, and exact description, reference being had to the accompanying drawings, forming part of this specification, in which—

Figure 1:
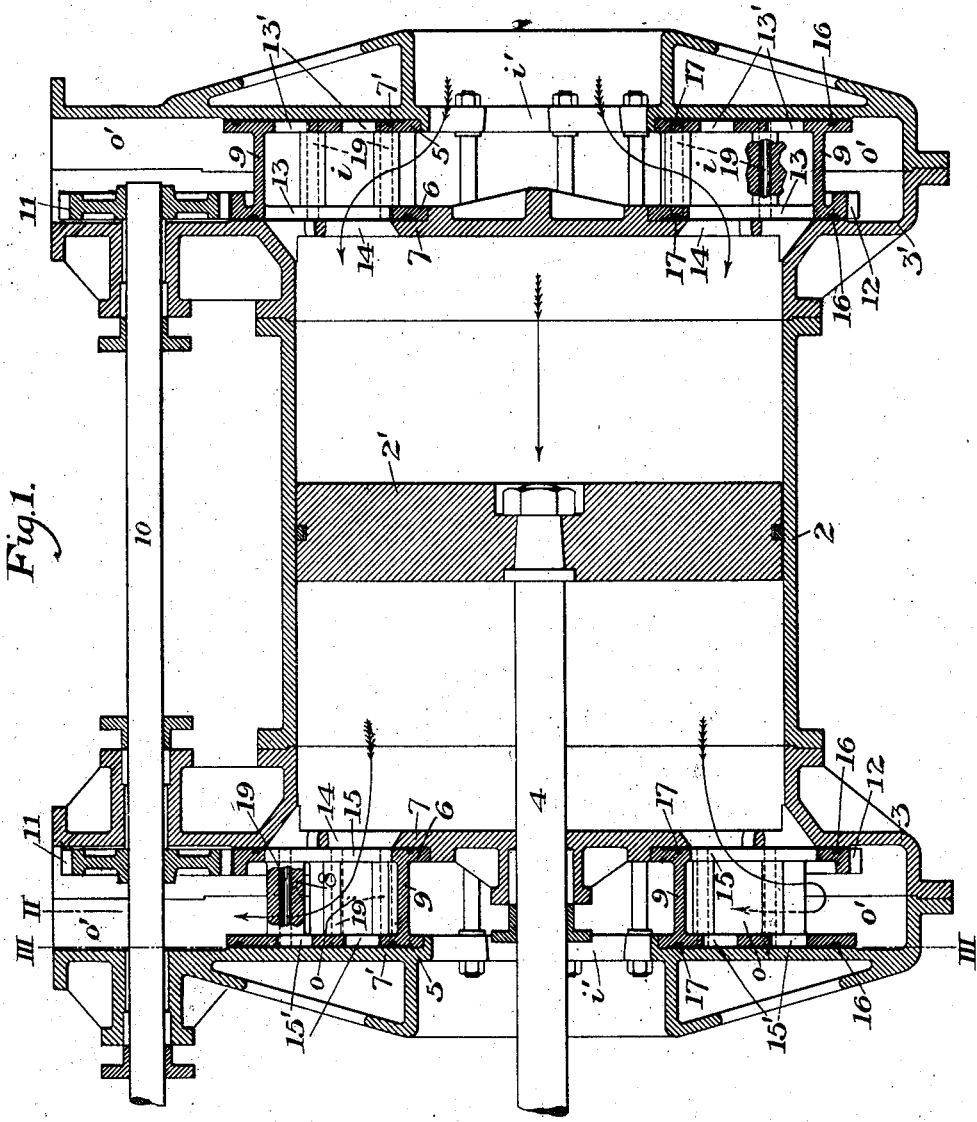
Figure 2:
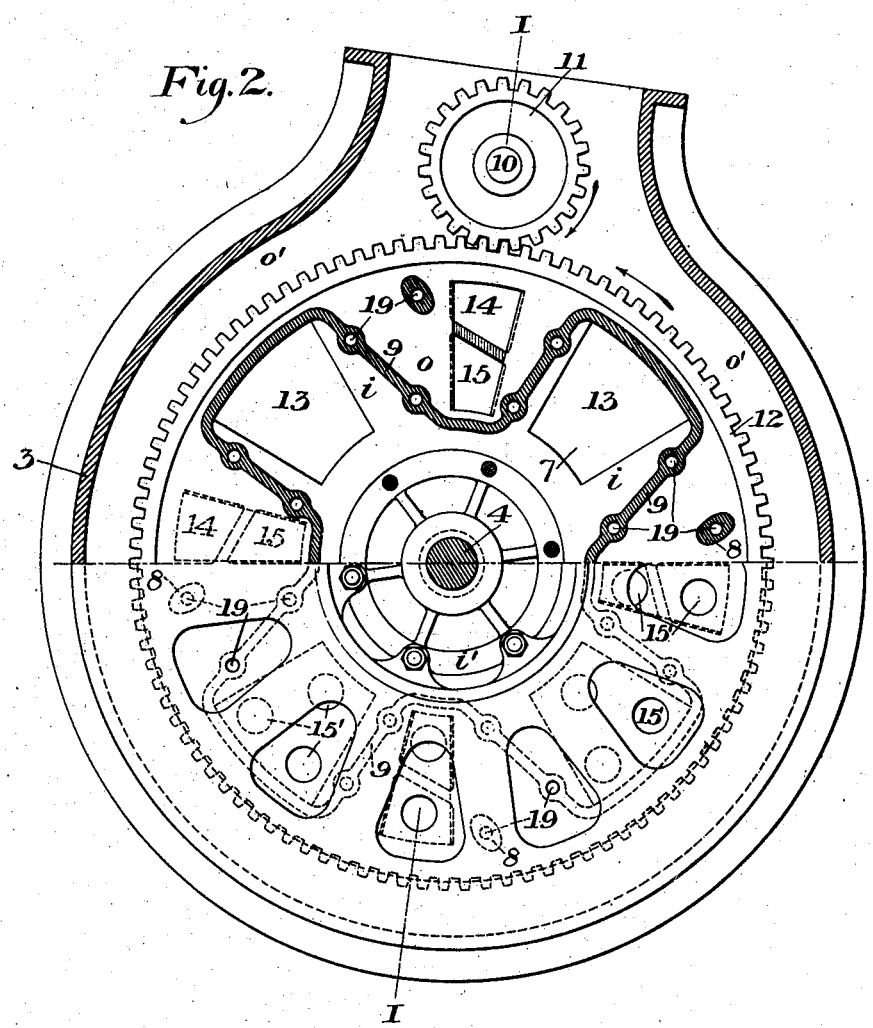
Figure 6:
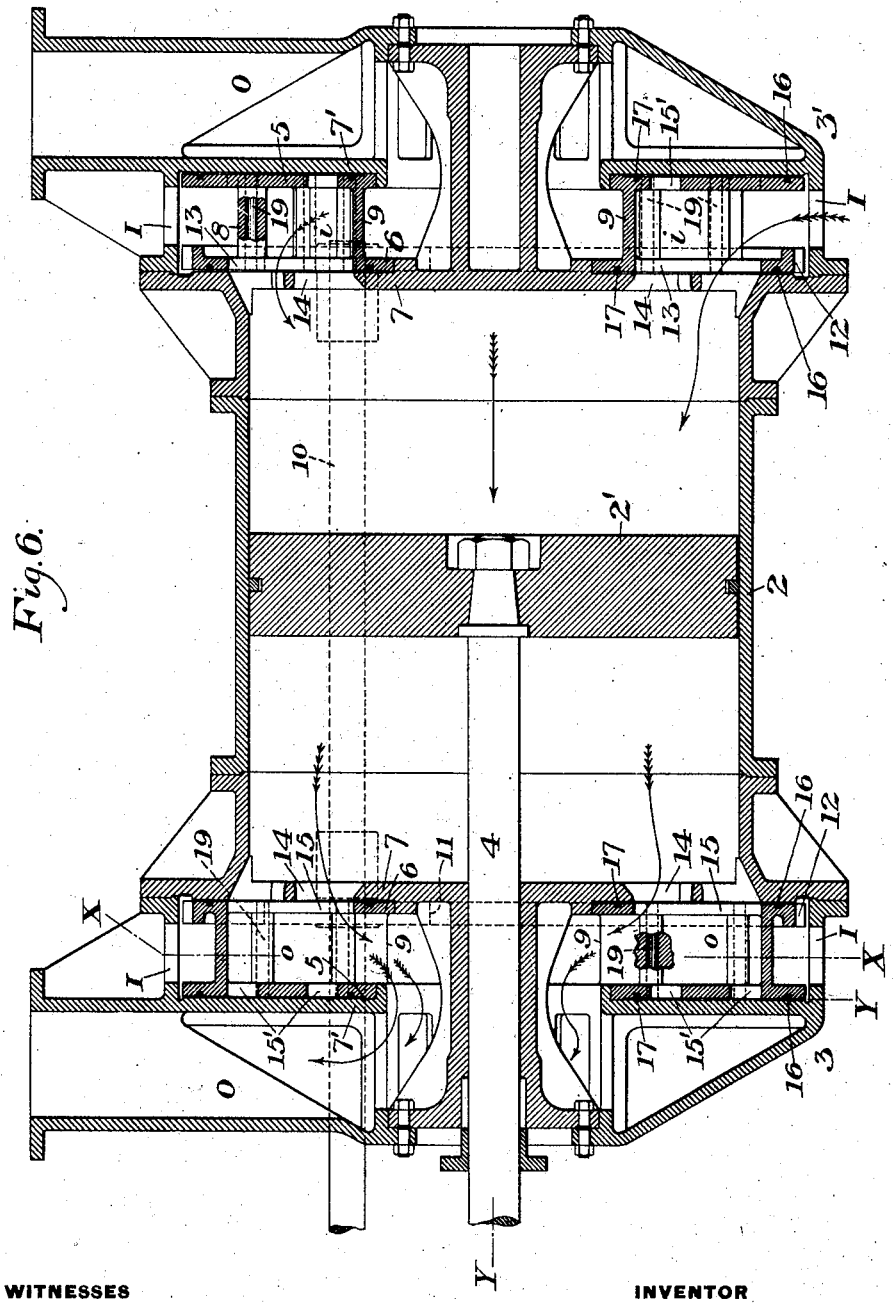
Figure 7:
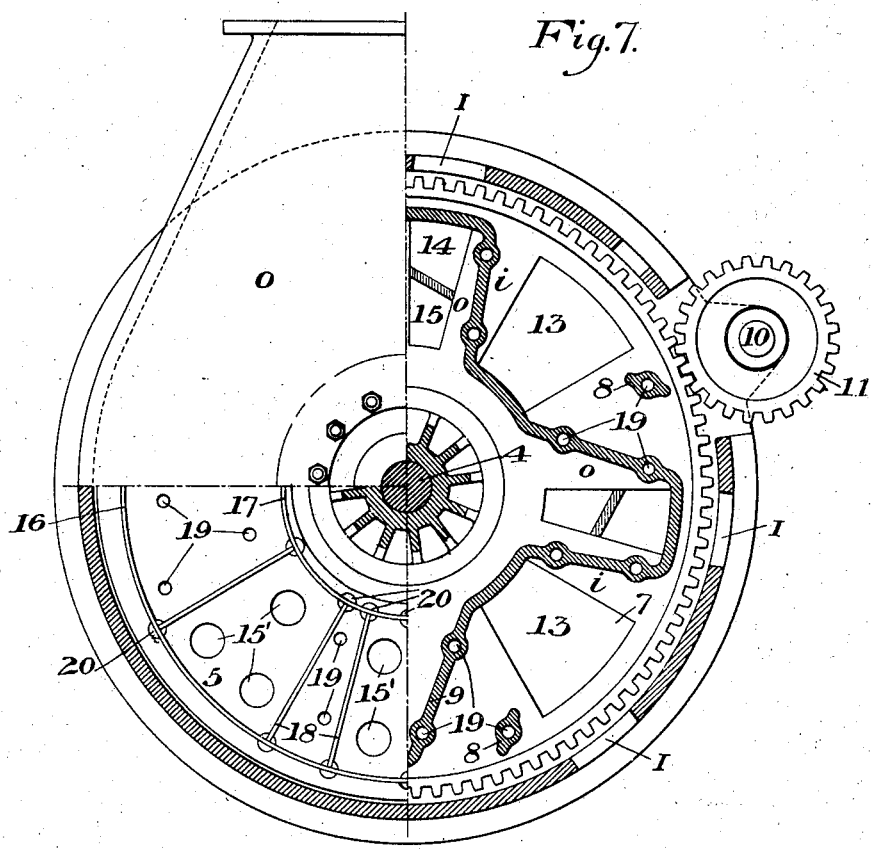

Figure 1 is a vertical longitudinal section of a blowing-engine cylinder provided with my valve mechanism, the section being on the line I I of Fig. 2. Fig. 2 is an end elevation, partly in section, on plane of the vertical line II of Fig. 1. Fig. 3 is a vertical section on the line III III of Fig. 1. Fig. 4 is a sectional detail view of the packing mechanism, the section being on the line IV IV of Fig. 5. Fig. 5 is a detail plan view of the bearing-face of the disk 5 shown in Fig. 4. Fig. 6 is a view similar to Fig. 1, showing a modification, the air-ports being arranged on the periphery of the cylinder-heads, while in Fig. 1 these ports are shown on the ends of the cylinder-heads; and Fig. 7 is an end elevation and an irregular vertical section on the lines $x\ x$ and $y\ y$ of Fig. 6.

In the drawings, 2 represents a cylinder of a blowing-engine such as is used for supplying air for blast furnaces and converters, and 2' is the piston which reciprocates in the cylinder. These parts may be horizontal or vertical in position, as desired. At each end of the cylinder is a head 3 3', which contains the valve mechanism. The piston-rod 4 extends through one of the heads and may be prolonged so as to extend through the other head.

Referring to Figs. 1 to 5, each cylinder-head is hollow and affords a cylindrical space for the rotary valve mechanism. This mechanism consists of a hollow ring composed of two annular disks 5 6, the outer disk 5 having a bearing against the outer wall 7' of the cylinder-head and the inner disk 6 having ports which register with ports in the inner wall 7 thereof. The parts 5 and 6 are connected by integral posts 8 and by an irregular wall 9, which may also be integral with the parts 5 and 6 and divides the valve into alternate inlet and outlet chambers $i$ and $o$, the inlet-chambers all communicating with the central inlet-port $i'$ at the center of the cylinder-heads. The outlet-chambers all communicate with an air-discharge pipe or chamber $o'$, which in Figs. 1 and 2 extends around the periphery of the cylinder-head and leads to the pipe by which the blast is conducted to the furnace or other place of use. The valves are rotary, and each is driven by a shaft 10, carrying pinions 11, which mesh with teeth formed on the periphery of the valve, as at 12, so that both valves rotate continuously and together and at the same speed, which effects a complete revolution of the valve at four revolutions of the engine, there being four inlet-ports and four outlet-ports for each valve. If a different number of ports is employed, the rate of rotation will be varied. Each of the inlet-chambers $i$ has an inlet-port 13, adapted to register at intervals with ports 14 on the inner wall 7 of the cylinder, there being four of the ports 14, which serve alternately as inlet and outlet ports, as explained below. Each of the outlet-chambers $o$ has a port 15 extending through the inner disk 6 of the valve and adapted to register with the ports 14 as the valve rotates, the alternate arrangement of the ports 13 and 15 being such that in the rotation of the valve the inlet-ports 13 shall be brought into register with the ports 14 during the motion of the piston away from the valve and that the further rotation of the valve will bring the outlet-ports 15 into register with the ports 14 during the approach of the piston, the blank spaces between the inlet and outlet ports of the valve being such size as to close the ports 14 during the proper intervals. The relative position of the valves at the respective ends of the cylinder is such that while the inlet-ports of one valve are in action the outlet ports of the valve at the other end of the cylinder are also active, and vice versa. The alternate arrangement of the inlet and outlet ports results in subjecting all parts of the valve symmetrically to pressure, whereas if the inlet-ports were on one part and the outlet-ports on another the valve would be subjected to unequal and unbalanced pressure.

The valves are inserted loosely between the inner and outer walls of the cylinder-head and are provided with annular packing-strips 16 17 and with cross packing-strips 18, extending between the annular strips. The annular strips, as shown in Fig. 2, are preferably somewhat eccentric to the valve, so that as the valve rotates the strips will not wear a circular groove on the face of the cylinder-head with which they are in contact. The cross-strips 18 bound the openings of the ports of the valve and the intermediate spaces between the ports. For the purpose of perfectly balancing all parts of the valve so that each side of the valve will be in perfect balance with the portion directly opposite it each space bounded by the packing-strips on one face of the valve, as shown in Fig. 3, has a corresponding space of the same area bounded by the packing-strips on the opposite face of the valve, and opposite to each of the ports 13 and 15, which are on the inner face of the valve, is a port or ports 13' 15' on the outer face of the valve, which serves to admit the pressure from the chamber controlled by such port 13 or 15 to the space between the outer face of the valve and the outer end 7' of the cylinder-head. In each of the intermediate spaces bounded by the packing-strips between the ports of the valve there are openings 19, extending through the studs 8 and the walls 9 and connecting each intermediate packing-bounded space on the outer face of the valve with the corresponding space on the opposite face of the valve, so that each space will be subject to the same conditions of pneumatic pressure as its opposite space. The valve is therefore perfectly balanced under all conditions, even though the pressures to which it is subjected at various places may be widely different. It can be rotated easily and without wear, and the severe usage and friction to which blowing-engine valves have heretofore been subjected is done away with. The great advantage of this in the operation of blowing-engines, especially those used in the pumping of air impregnated with grating material, will be appreciated by those skilled in the art.

The cross-packings 18 are preferably arranged along the edges of the ports and themselves form the cutting edges of the valve. Their preferable construction is shown in Figs. 4 and 5 and is as follows: At each meeting-point of the cross packing-strips with the circular strips there is a plug 20, movably set in a recess 21 on the inner face of the valve and pressed forwardly by a spring 22. The circular packing-strips, as well as the cross-strips, are neatly fitted into grooves in the plugs, which serve to seal the joints between the strips, and each strip is pressed forwardly by a spring 22, preferably a crimped spring of clock-spring steel, which serves to hold it against the opposing face of the cylinder.

In the modification shown in Figs. 6 and 7 the air-inlets I are formed in the periphery of the cylinder-head instead of the center, and the outlet O is at the center, the parts being the converse of the parts shown in Figs. 1, 2, and 3. In like manner the chambers $o$ of the valve are on the inner side of the wall 9, and the chambers $i$ are on the outer side of the wall, the reverse of the arrangement shown in the other figures.

Many other modifications of my invention may be made by those skilled in the art, and parts of the apparatus described above may be used independently or without the other part. If desired, within the scope of my invention as broadly claimed the packing-rings may be employed on one face only of the valve, the opposite face being provided with fixed ridges. The inner and outer faces of the valve and of the cylinder-head need not be parallel, as each may be made conical, if desired. The packing-strips may be placed in the faces of the cylinder-head instead of being on the valve. If desired, the valve may be used only with the inlet-ports above described or only with the outlet-ports above described, some other form of outlet-valve or inlet-valve being used therewith.

I claim—

1. In combination with a cylinder and piston, a continuously-rotating valve set between opposite working surfaces and having alternately-arranged inlet and outlet ports, said cylinder having ports with which the valve-ports are alternately brought into register, said valve having within its body inlet and outlet passages communicating with inlets and outlets at the central and peripheral portions of the valve-chamber respectively; substantially as described.

2. In combination with a cylinder and piston, a continuously-rotating valve set between opposite working surfaces, said valve and cylinder having inlet and outlet ports arranged alternately around the circumference of the valve, and means whereby said valve is subjected symmetrically to pressure at all parts; substantially as described.

3. In combination with a cylinder and piston, a continuously-rotating valve set between opposite working surfaces in the cylinder-head and having alternately-arranged inlet and outlet ports and means for balancing the pressure on opposite sides of said valve, said cylinder-head having ports with which the valve-ports are alternately brought into register, the axis of rotation of the valve being coincident or parallel with the axis of the cylinder; substantially as described.

4. In combination with a cylinder and piston, a continuously-rotating valve set between opposite surfaces, ports leading through one surface to the cylinder, and adapted to communicate with ports on the valve, and means for establishing equilibrium of pressure on opposite sides of the valve; substantially as described.

5. In combination with a cylinder and piston, a continuously-rotating valve set between opposite surfaces, ports leading through one surface to the cylinder and adapted to communicate with ports in the valve, said valve-ports communicating respectively with the space between the valve and the other of said surfaces, the last-named ports being separated by packing; substantially as described.

6. In combination with a cylinder and piston, a rotary valve composed of two disks connected by a wall disposed to constitute a series of alternate inlet-chambers and outlet-chambers between the disks, one of the disks being provided with inlet and outlet ports, adapted to register alternately with ports on the cylinder, and the valve being set between opposite faces of the cylinder; substantially as described.

7. A continuously-rotating valve having front and rear faces working freely between fixed surfaces and having on one face inlet and outlet ports alternating with each other and with intermediate portions, similar intermediate portions on the opposite face of the valve, said ports and portions being bounded by packing, and means for balancing the pressure between the bounded portions on opposite sides of the valve; substantially as described.

8. A valve having front and rear faces working freely between fixed surfaces and having on one face inlet and outlet ports alternating with each other and with intermediate portions, said ports and portions being bounded by packing and having on the other face correspondingly-bounded spaces, the spaces of equal area respectively on the latter face being connected with corresponding spaces on the other face by pressure-equalizing channels; substantially as described.

9. A valve having front and rear faces working freely between fixed surfaces and having on one face inlet and outlet ports alternating with each other and with intermediate portions, said ports and portions being bounded by packing and having on the other face correspondingly packing-bounded spaces, the spaces on the latter face being connected with corresponding spaces on the other face by pressure-equalizing channels; substantially as described.

10. A valve having front and rear faces working between fixed surfaces and having on one face ports alternating with intermediate portions and on the opposite side similar intermediate portions, said ports and portions being bounded by packing and means for equalizing the pressure within the opposite bounded portions; substantially as described.

11. A valve having front and rear faces working freely between fixed surfaces and having on one face alternating ports and intermediate portions, each bounded by packing, and having on the opposite face correspondingly-bounded spaces, the spaces on each face being connected with the corresponding spaces on the other face by pressure-equalizing orifices; substantially as described.

12. A continuously-rotating valve having front and rear faces working freely between fixed surfaces and having on one face ports alternating with intermediate portions, said ports and portions being bounded by packing and having on the other face correspondingly-bounded spaces, the spaces on the latter face being connected with corresponding spaces on the other face by pressure-equalizing channels; substantially as described.

13. A rotating disk valve having packing-rings extending eccentrically around the face of the valve and having cross packing-strips; substantially as described.

14. A rotating disk valve having packing-rings extending around the face of the valve, and having cross packing-strips; substantially as described.

15. A rotating disk valve having packing-rings extending around the face of the valve and having cross packing-strips, and spring-actuated plugs at the points of meeting of the packings; substantially as described.

16. A continuously-rotating valve composed of disks and having inlet and outlet chambers between the disks communicating with ports in one of the disks and also communicating respectively with the periphery and middle portions of the valve-chamber; substantially as described.

In testimony whereof I have hereunto set my hand.

JULIAN KENNEDY.

Witnesses:
GEO. B. BLEMING,
JOHN MILLER.